(12) United States Patent
Evans et al.

(10) Patent No.: US 10,806,067 B2
(45) Date of Patent: Oct. 20, 2020

(54) LAND ROLLER

(71) Applicant: Degelman Industries Ltd., Regina (CA)

(72) Inventors: Miles Evans, Emerald Park (CA); Kelly Lucas, Regina (CA); Scott R. Degelman, Regina (CA)

(73) Assignee: Degelman Industries LP, Saskatoon (CA)

( * ) Notice: Subject to any disclaimer, the term of this patent is extended or adjusted under 35 U.S.C. 154(b) by 0 days.

(21) Appl. No.: 15/623,080

(22) Filed: Jun. 14, 2017

(65) Prior Publication Data
US 2018/0000003 A1    Jan. 4, 2018

(30) Foreign Application Priority Data

Jun. 14, 2016   (CA) ...................................... 2932816

(51) Int. Cl.
*A01B 73/06* (2006.01)
*A01B 29/02* (2006.01)

(52) U.S. Cl.
CPC ............ *A01B 73/067* (2013.01); *A01B 29/02* (2013.01); *A01B 73/065* (2013.01)

(58) Field of Classification Search
CPC ............................ A01B 73/067; A01B 73/065
See application file for complete search history.

(56) References Cited

U.S. PATENT DOCUMENTS

| | | |
|---|---|---|
| 62,822 A | 3/1867 | Crowe |
| 3,637,027 A | 1/1972 | Kovar |
| 3,844,358 A | 1/1974 | Shuler et al. |
| 3,880,241 A | 4/1975 | Vincent |
| 3,935,696 A * | 2/1976 | Pavel .................... A01B 73/067 172/311 |
| 3,948,327 A | 4/1976 | Parker et al. |
| 4,042,044 A * | 8/1977 | Honnold .............. A01B 73/067 172/311 |
| 4,126,187 A | 11/1978 | Schreiner et al. |
| 4,168,750 A | 9/1979 | Combs |
| 4,223,742 A | 9/1980 | Stark |

(Continued)

FOREIGN PATENT DOCUMENTS

| | | |
|---|---|---|
| CA | 1284742 C | 6/1991 |
| CA | 2635377 A1 | 12/2008 |

(Continued)

*Primary Examiner* — Jessica H Lutz
(74) *Attorney, Agent, or Firm* — Craig J. Lervick; Larkin Hoffman Daly & Lindgren Ltd.

(57) ABSTRACT

A land roller is provided the can be transformed between a transport position and an operating position by at least one actuator. The land roller can have a center section with a center roller, a hitch member connected to the center section, a first wing section pivotally connected at a first end to the center section and having a first wing roller, a second wing section pivotally connected at a first end to the center section and having a second wing roller. The at least one actuator can rotate a first rotating member that pivots the first wing section and rotate a second rotating member that pivots the second wing section to transform the land roller from the transport position into the operating position. The at least one actuator is unconnected to the first rotating member and the second rotating member.

21 Claims, 9 Drawing Sheets

(56) References Cited

U.S. PATENT DOCUMENTS

| | | | |
|---|---|---|---|
| D258,657 S | 3/1981 | Stark | |
| 4,341,269 A | 7/1982 | Hann | |
| 4,360,215 A * | 11/1982 | Nohl | A01B 73/067 172/240 |
| 4,766,803 A * | 8/1988 | Cartee | A01B 73/067 56/208 |
| 4,881,603 A * | 11/1989 | Hartman | A01B 73/067 172/311 |
| 4,896,732 A | 1/1990 | Stark | |
| 5,251,704 A * | 10/1993 | Bourgault | A01B 49/04 172/247 |
| 5,715,893 A | 2/1998 | Houck | |
| 5,809,914 A | 9/1998 | Follmer | |
| 6,112,827 A | 9/2000 | Reiber et al. | |
| 6,119,788 A | 9/2000 | Bernier | |
| 6,119,792 A | 9/2000 | Almer | |
| 6,192,994 B1 | 2/2001 | Friggstad et al. | |
| 6,318,477 B1 | 11/2001 | Bettin | |
| 6,502,645 B1 | 1/2003 | Brueggen et al. | |
| 6,561,283 B2 | 5/2003 | Hundeby | |
| 6,837,033 B2 | 1/2005 | Schlesser et al. | |
| 6,869,025 B2 | 3/2005 | Guesdon | |
| 7,021,397 B2 | 4/2006 | Pitonyak et al. | |
| 7,024,844 B2 | 4/2006 | Schlesser et al. | |
| 7,051,501 B2 | 5/2006 | Schlesser et al. | |
| 7,861,795 B2 | 1/2011 | Dillon | |
| 8,820,428 B2 | 9/2014 | McCrea et al. | |
| 9,392,738 B1 * | 7/2016 | Fehr | A01B 73/048 |
| 2008/0314605 A1 | 12/2008 | Degelman et al. | |
| 2009/0114406 A1 * | 5/2009 | Read | A01B 73/02 172/1 |
| 2009/0236108 A1 * | 9/2009 | Stark | A01B 63/245 172/311 |
| 2011/0265699 A1 * | 11/2011 | McCrea | A01B 29/02 111/178 |

FOREIGN PATENT DOCUMENTS

| | | |
|---|---|---|
| CA | 2719664 A1 | 5/2011 |
| GB | 2110061 A | 6/1983 |

* cited by examiner

FIG. 9

LAND ROLLER

The present invention relates to an agricultural implement for leveling and compacting a field or other site commonly called a land roller and more particularly to mechanisms to transform a land roller between an operating position and a transport position.

BACKGROUND

Land rollers are pulled behind a tractor or other vehicle to compact soil, smaller rocks and stones and flatten a field. While they can be used in construction to compact and flatten the ground at a build site or for road construction, they are often used in agriculture in a field to form a relatively level ground surface and increase soil density before or after a crop is planted in the field.

These land rollers are typically of a substantial size and use a number of "rollers" to roll over and flatten the ground. Because they need to flatten the ground surface, these rollers are usually quite heavy. The use of a number of rollers is so that a relatively wide swath of ground can be covered by the land roller in each pass with the multiple rollers being spread out roughly in a line behind the tractor or other tow vehicle and with each roller positioned substantially perpendicular to the travel direction of the land roller.

However, the size and weight of land rollers can make them difficult to transport such as when the land roller is transported between fields and along roads. Most land rollers can fold into a transport position where some of the rollers are folded to make the width of the land roller suitable for transport along public roads. A number of these existing land rollers can be altered from their transport position to their operating position by using a tractor or other tow vehicle to back up the land roller, causing wing sections to fold out as the land roller is backed up. At least one type of land roller can even be unfolded into its operation position by using a tow vehicle to drive forward causing the wing sections of the land roller to partially fold out into their operating position then back up the rest of the way.

However, the issue with these types of land rollers that are unfolded by either using the tow vehicle to move the land roller forward or backwards is that they tend to take a lot of space to unfold for use. The tow vehicle and land roller must have a lot of room to be maneuvered forward or backwards to get the land roller to fold out into its operating position. Previous attempts to have them open into the operating position with hydraulic rams have often been unsatisfactory because the hydraulic cylinder(s) lock the wings in place in the transport position making it difficult to transport the land rollers.

SUMMARY OF THE INVENTION

In an aspect, a land roller is provided. The land roller has a center section with a center roller, a hitch member connected to the center section, a first wing section pivotally connected at a first end to the center section and having a first wing roller, a second wing section pivotally connected at a first end to the center section and having a second wing roller and at least one actuator operative to rotate a first rotating member that pivots the first wing section and rotate a second rotating member that pivots the second wing section into an operating position from a transport position. The at least one actuator unconnected to the first rotating member and the second rotating member.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
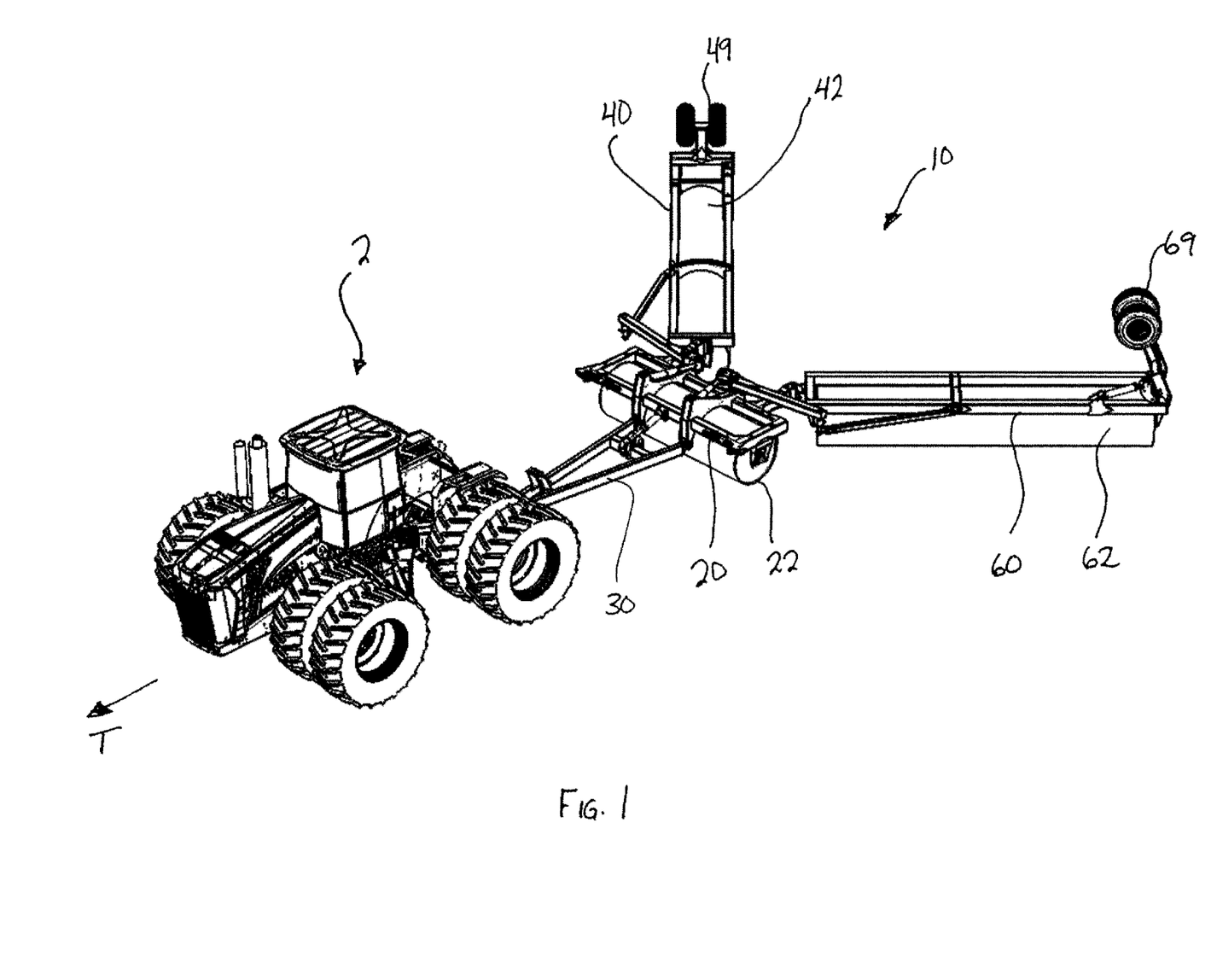
FIG. 1 is a perspective view of a land roller hitched behind a tow vehicle.
Figure 2:
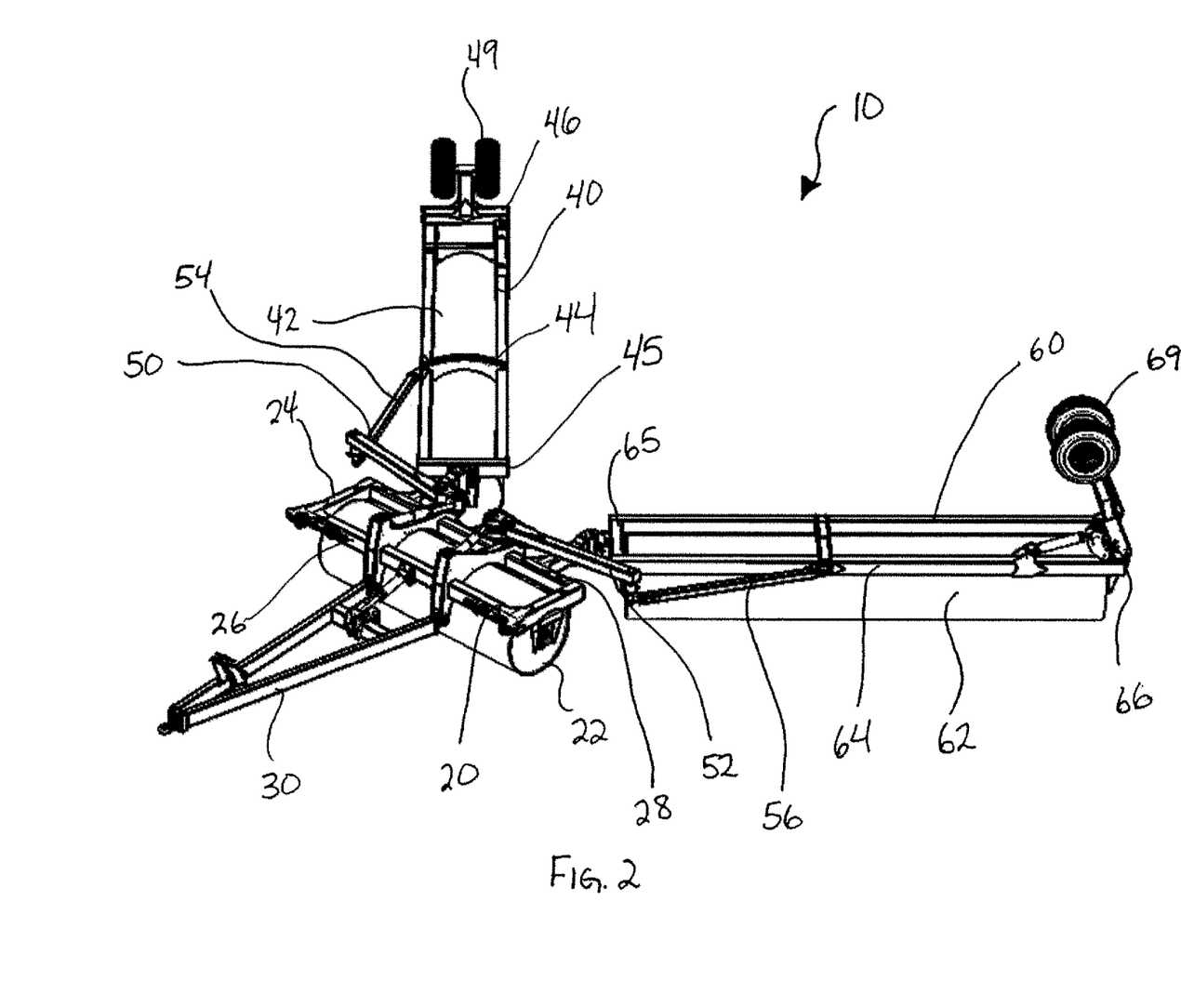
FIG. 2 is a perspective view of the land roller of FIG. 1.
Figure 3:
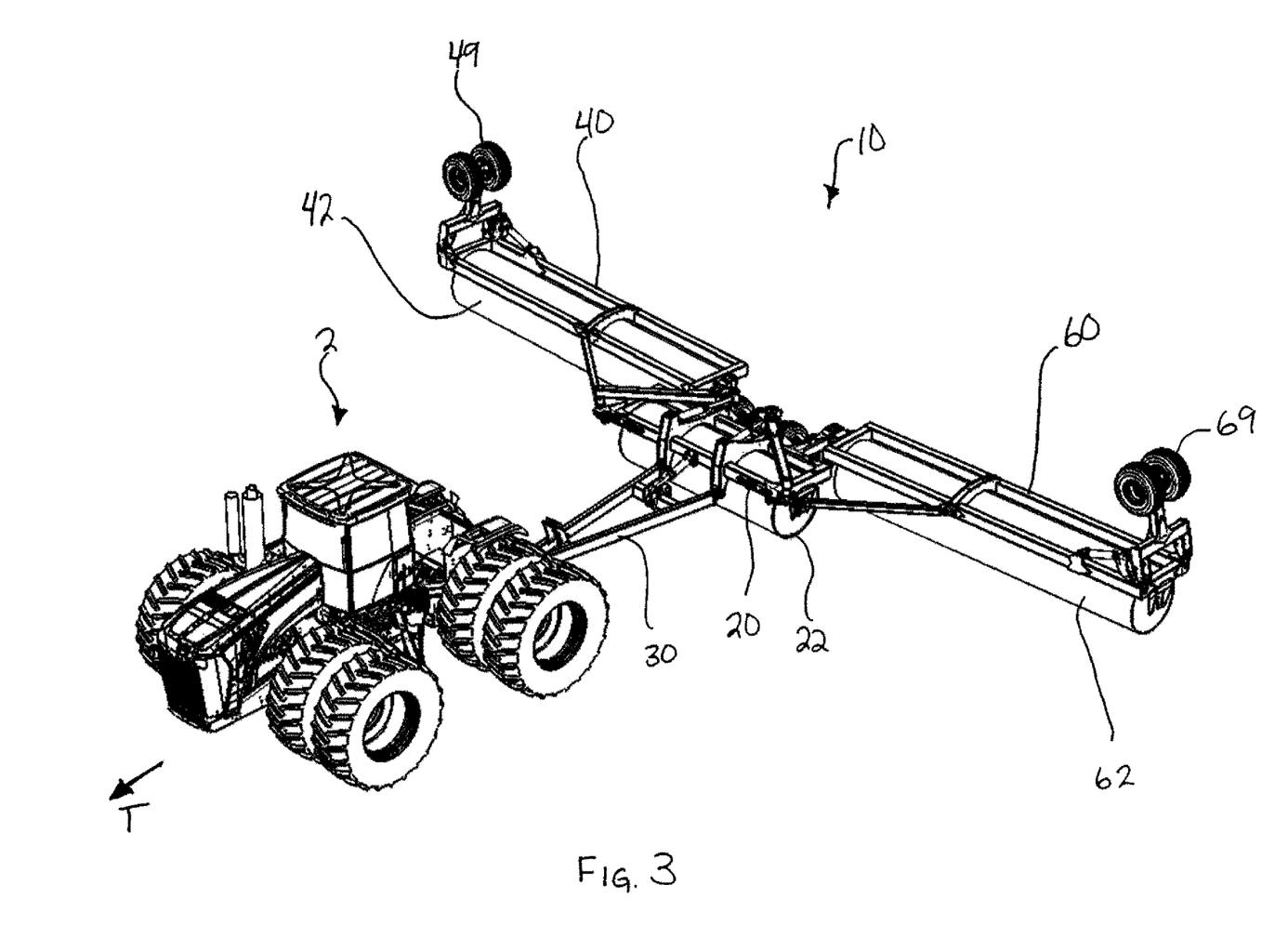
FIG. 3 illustrates the land roller of FIG. 1 in an operating position.
Figure 4:
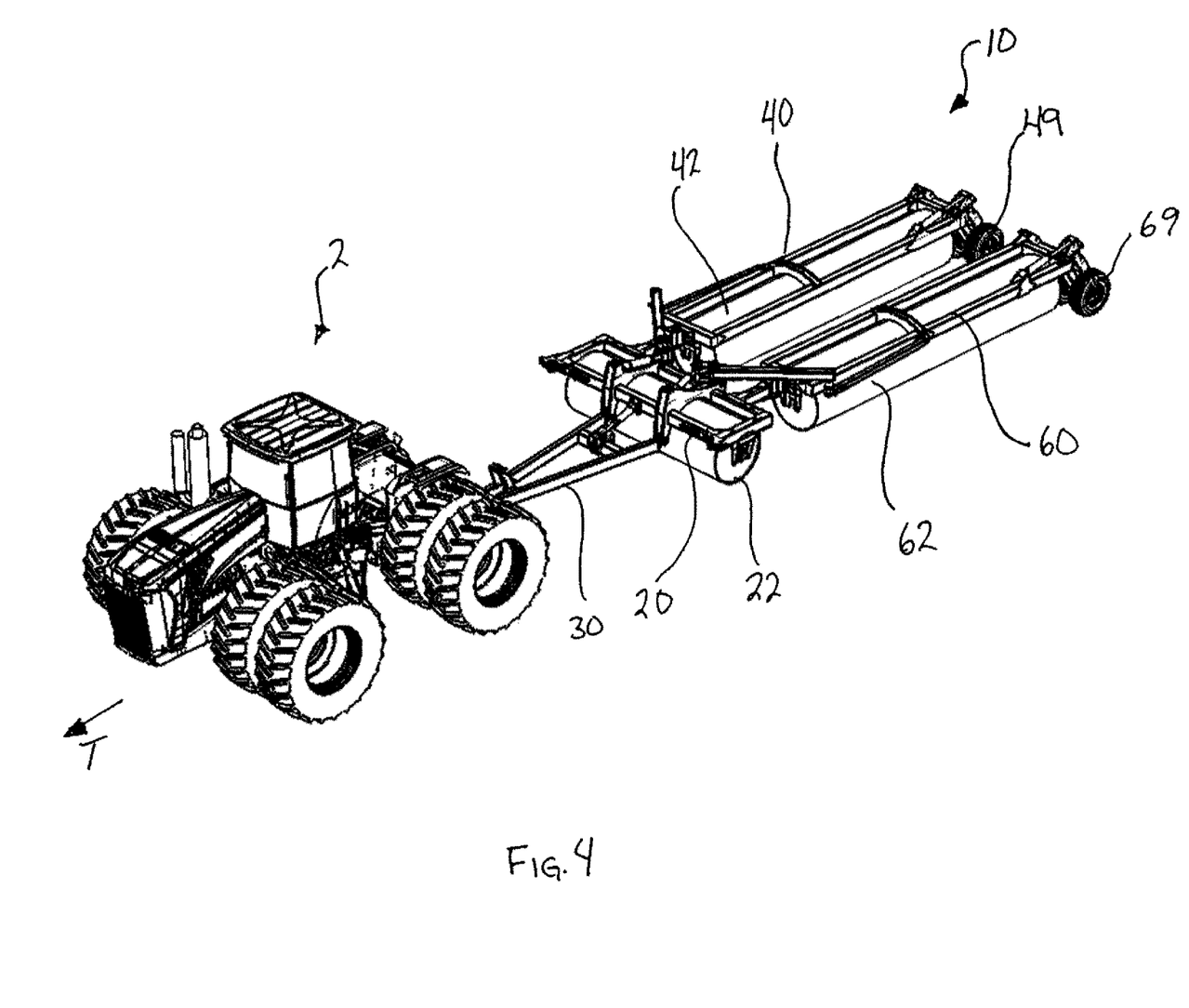
FIG. 4 illustrates the land roller of FIG. 1 in a transport position.

FIGS. 1 and 2 show a land roller 10 having a center section 20 with a center roller 22, a first wing section 40 with a first wing roller 42 and a second wing section 60 with a second wing roller 62. The land roller 10 can be hitched to a tow vehicle 2, such as a tractor, and towed in a travel direction T of the land roller 10. When the land roller 10 is in use in a field or other site, the land roller 10 can be placed in an operating position with the first wing section 40 and the second wing section 60 folded forward to be positioned substantially perpendicular to the travel direction T of the land roller 10 as shown in FIG. 3. This allows the center roller 22, the first wing roller 42 and the second wing roller 62 to cover as wide a section of the field as possible. When the land roller 10 is to be transported to another location, such as over public roads, the land roller 10 can be placed into a transport position with the first wing section 40 and the second wing section 60 folded backward extending along their length behind the center section 20 with the first wing section 40 and the second wing section 60 positional substantially parallel to the travel direction T of the land roller 10 as shown in FIG. 4.

Figure 5:
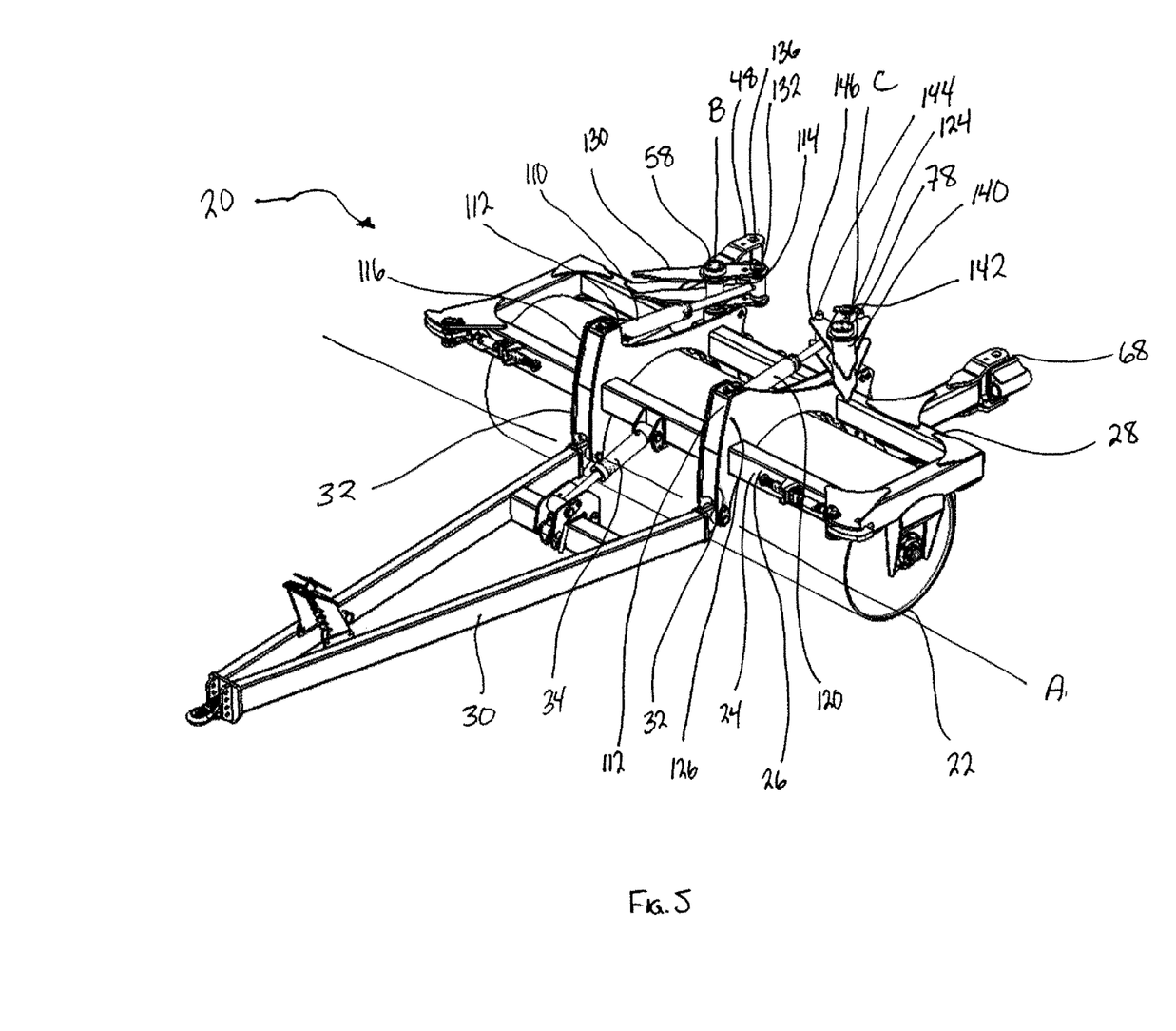
FIG. 5 illustrates a detailed view of the land roller of FIG. 1 showing the details of a center section of the land roller.

Referring to FIG. 5, the center section 20 of the land roller 10 can have a center frame 24 for supporting the center roller 22 extending downwards from the center frame 24 and an A-frame hitch member 30 can be operatively connected to a front member 26 of the center frame 24 to allow the land roller 10 to be connected to the tow vehicle 2. Hitch connection members 32 can extend downwards from the front member 26 and the hitch member 30 can be pivotally connected to the hitch connection members 32 below the front member 26 of the center frame 24. In this manner, the center section 20 can pivot around an axis A defined where the hitch member 30 pivotally connects to the hitch connection members 32.

A center actuator 34, such as a float cylinder, can be connected between the hitch member 30 and the front member 26 of the center frame 24 so that the center actuator 34 can be used to selectively "lock" the center frame 24 relative to the hitch member 30 around the axis A or put the center actuator 34 in "float" mode allowing the center frame 24 to pivot relative to the hitch member 30. In this manner, the center actuator 34 can be used to "lock" the center frame 24 relative to the hitch member 30, such as when the land roller 10 is in the transport position, and the center actuator 34 can be placed in "float" mode to allow the center frame 24 to pivot around the hitch member 30 to allow the land roller 10 to move freely over rough terrain without being restricted by the hitch member 30.

Figure 6:
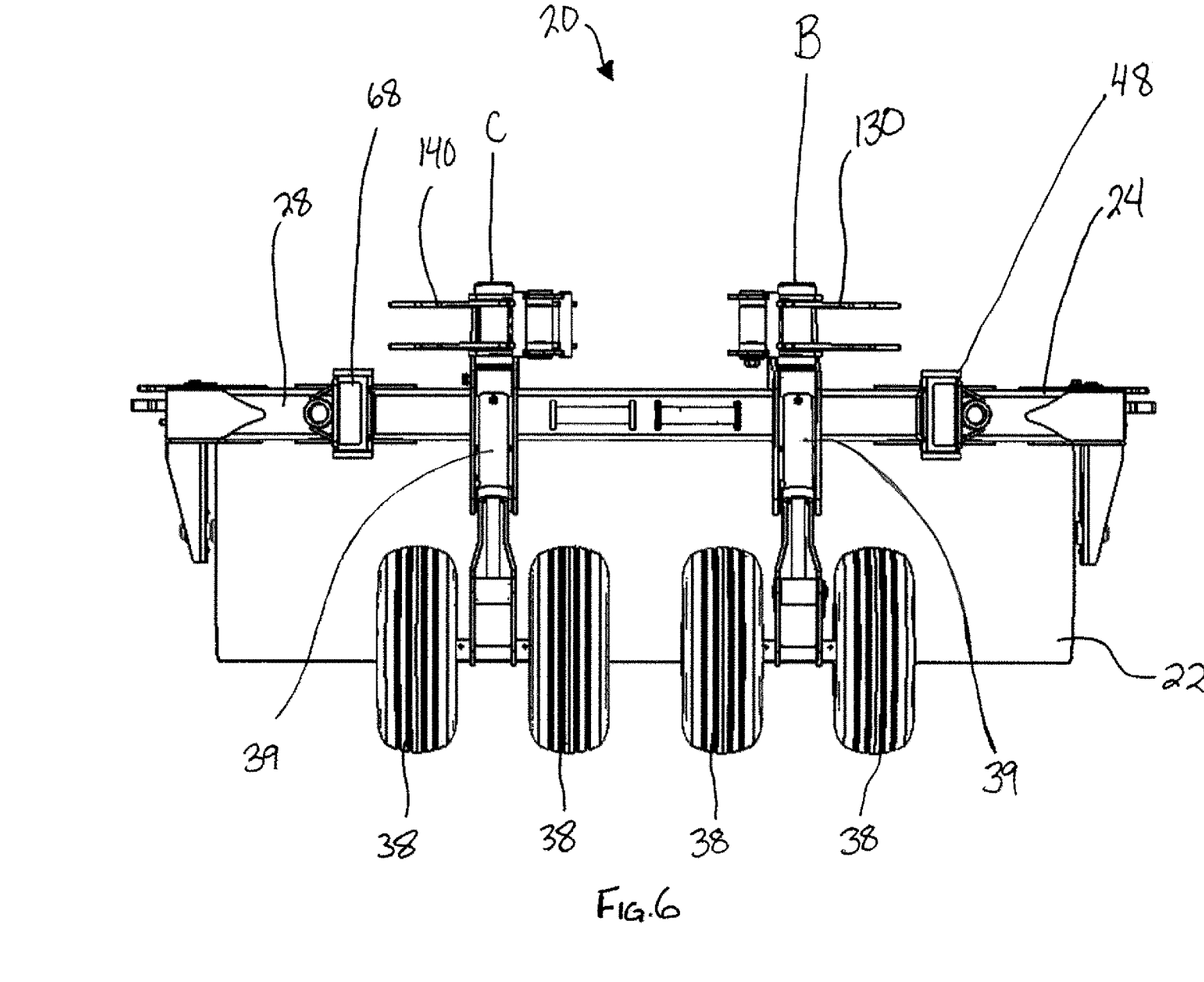
FIG. 6 illustrates a rear view of the center section of FIG. 5.

Referring to FIG. 6, ground wheels 38 can be provided attached to the rear member 28 of the center frame 24 by wheel actuators 39, such as hydraulic cylinders. The ground wheels 38 can be used to carry the weight of the center section 20 when the land roller 10 is in the transport position by extending the wheel actuators 39 to place the ground wheels 38 in contact with the ground surface and lift the center roller 22 off of the ground surface. When the land roller 10 is placed in the operating position, the wheel actuators 38 can be retracted to lift the ground wheels 38 off of the ground surface thereby causing the center section 24 to be supported by the center roller 22.

A first connection member 48 and a second connection member 68 can be attached to the rear member 28 of the center frame 24. The first wing section 40 can be pivotally attached to the first connection member 48 and the second wing section 60 can be pivotally attached to the second connection member 68 thereby allowing the first wing section 40 and the second wing section 60 to be rotated relative to the center section 20.

The first wing section 40 can have a first wing frame 44 for supporting the wing roller 42 extending downwards and below the first wing frame 44 and the second wing section 60 can have a second wing frame 64 for supporting the second wing roller 62 extending downwards and below the second wing frame 64. A first end 45 of the first wing frame 40 can be pivotally connected to the first connection member 48 attached to the rear portion 28 the center frame 24 and a first end 65 of the second wing frame 60 can be pivotally connected to the second connection member 68 attached to the rear portion 28 the center frame 24. In this manner, the first wing section 40 can be pivoted around its first end 45 and the first connection member 48 and the second wing section 60 can be pivoted around its first end 65 and the second connection member 68. This allows the land roller 10 to be converted between an operating position where the first wing section 40 and the second wing section 60 are positioned approximately perpendicular to the travel direction T of the land roller 10 (as shown in FIG. 3) and a transport position where the first wing section 40 and the second wing section 60 are pivoted backwards to extend behind the center section 20 of the land roller 10 (as shown in FIG. 4).

Travelling wheels 49, 69 can be connected to a second end 46 of the first wing section 40 and a second end 66 of the second wing section 60, respectively. The travelling wheel 49, 69 can be fixed in a direction and pivotal vertically to swing the travelling wheels 49, 69 upwards and away from the ground surface or downwards against the surface to support the first wing section 40 and the second wing section 60 up and off the ground surface when the land roller 10 is in the transport position.

Figure 7:
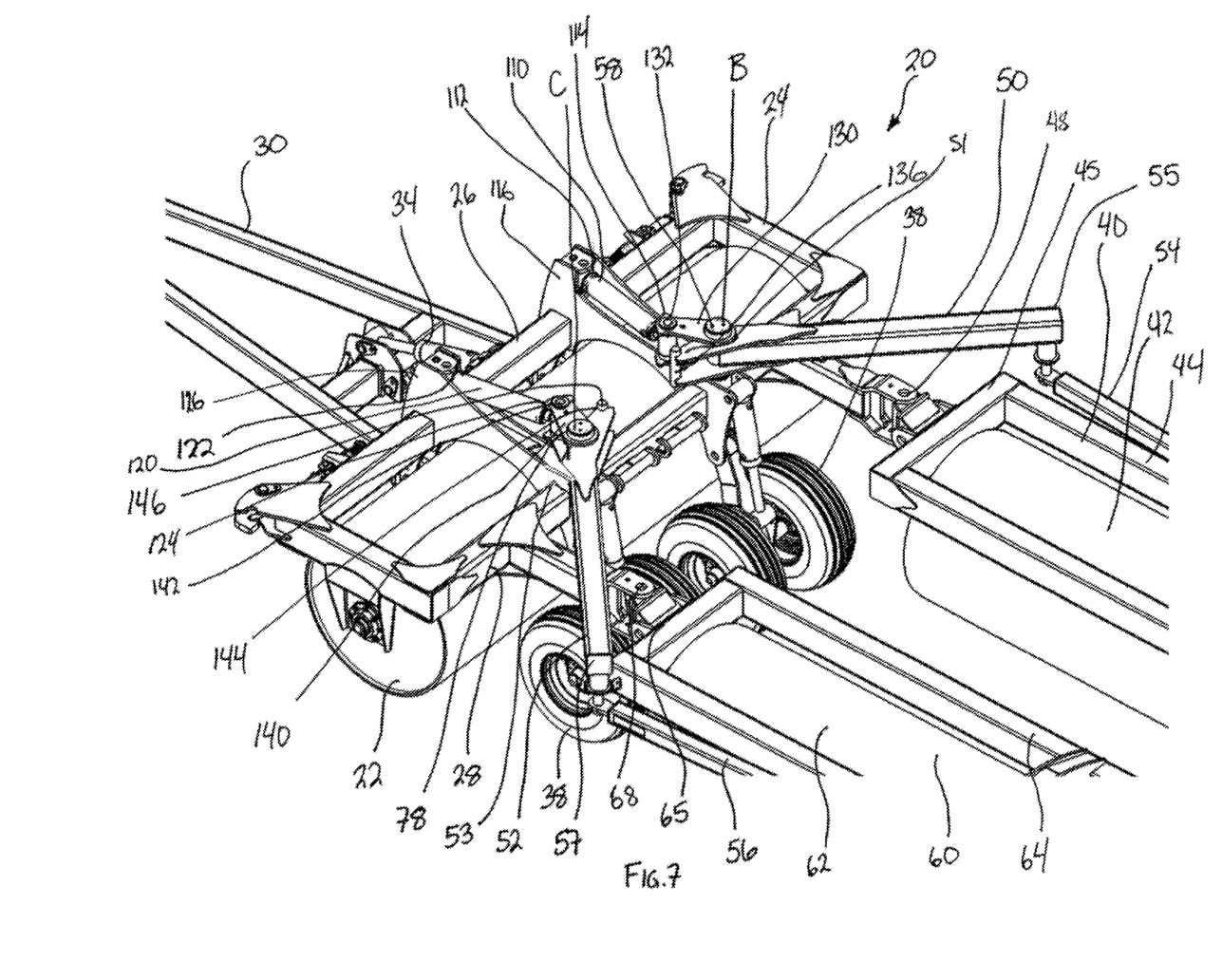
FIG. 7 illustrates a close up view of actuators on the center section of the land roller of FIG. 1.

Referring to FIG. 7, the first wing section 40 and the second wing section 60 can be moved into the operating position from the transport position using first and second rotation members 50, 52 and first and second linkages 54, 56, respectively. The first rotation member 50 and the second rotation member 52 can be rotatably attached to the center frame 34 at first and second pivot connections 58, 78, respectively. In one aspect, a first end 51 of the first rotation member 50 can extend past the first pivot connection 58 and a first end 53 of the second rotation member 52 can extend past the second pivot connection 78 so that the first rotation member 50 and second rotation member 52 are pivotal at a point along their lengths. Second ends 55, 57 of the rotation members 50, 52 can be pivotally connected to the first and second linkages 54, 56, which in turn can be pivotally connected to the first wing frame 44 and the second wing frame 64. In this manner, when the first and second rotation members 50, 52 are rotated around the pivotal connections 58, 78, the second ends 55, 57 of the rotation members 50, 52 will in turn pull on the first and second linkages 54, 56 which will in turn pull the first wing frame 40 and second wing frame 60 forward thereby rotating the first wing section 40 around the first connection member 48 and the second wing section 60 around the second connection member 68. This will rotate the first wing section 40 and second wing section 60 around their first ends 45, 65; rotating the first wing section 40 and the second wing section 60 forward and into the operation position with the first wing section 40 and the second wing section 60 substantially perpendicular to the travel direction T of the land roller 10.

Unlike a lot of land rollers that are moved into the operating position by backing up the entire land roller or moving it forward to fold out the wing sections, in the present land roller 10 one or more actuators, such as hydraulic cylinders, can be used to move the wing sections 40, 60 into the operating position while the center section 20 and the tow vehicle 2 remain stationary.

In one aspect, a first wing actuator 110 and a second wing actuator 120 can be used to move the first wing section 40 and the second wing section 60 from the transport position into the operating position. The first wing actuator 110 and the second wing actuator 120 can be hydraulic cylinders in one aspect.

The first wing actuator 110 can be used to move the first wing section 40 into the operating position from the transport position and the second wing actuator 120 can be used to move the second wing section 60 into the operating position. A first end 112 of the first wing actuator 110 can be pivotally connected to a first actuator mount 116 attached to the center frame 24 and a second end 114 of the first wing actuator 110 can be pivotally connected to a first engaging member 130. The first engaging member 130 can be pivotally connected to the center frame 24 so that the first engaging member 130 can pivot around an axis B. A first end 132 of the first engaging member 130 can be pivotally connected to the second end 114 of the first wing actuator 110 so that the first wing actuator 110 can pivot the first engaging member 130 around the axis B as the first wing actuator 100 is extended and retracted. The first engaging member 130 can be used to ensure the second end 114 of the first wing actuator 110 moves in a radius around the axis B that matches the radius of the first end 51 of the rotating member 50 as the rotating member 40 pivots around axis B as well. The second end 51 of the first rotation member 50 can have a push surface 136 that is positioned to engage with the first end 132 of the first engaging member 130 and the second end 114 of the first wing actuator 110 so that the second end 114 of the first wing actuator 110 can push against this push surface 136. The first rotating member 50 can also be pivotally connected to the center frame 24 so that the first rotating member 50 can also pivot around axis B. When the first wing actuator 110 is extended, the second end 114 of the first wing actuator 110 will push against the first end 132 of the first engaging member 130 and pivot the first engaging member 130 around axis B until the first end 132 of the first engagement member 130 and the second end 114 of the first wing actuator 110 pivot into contact with the push surface 136 on the first end 51 of the first rotating member 50 causing the second end 114 of the first wing actuator 110 to push against the push surface 136 of the first rotating member 50 and rotate the first rotating member 50 around axis B. The first rotating member 50 will in turn pull the first wing section 110 forward as it rotates; pivoting the first wing section 110 around the first connection member 48.

The second wing actuator 120 can be used to rotate the second wing section 60 into the operating position. A first end 122 of the second wing actuator 120 can be pivotally connected to a second actuator mount 126 attached to the center frame 24 and a second end 124 of the second wing actuator 120 can be pivotally connected to a second engaging member 140. The second engaging member 140 can be pivotally connected to the center frame 24 so that the second engaging member 140 can pivot around an axis C. A first end 142 of the second engaging member 140 can be pivotally connected to the second end 124 of the second wing actuator 120 so that the second wing actuator 120 can pivot the second engaging member 140 around the axis C as the second wing actuator 140 is extended and retracted. The second engaging member 140 can be used to ensure the second end 124 of the second wing actuator 120 moves in a radius around the axis D that matches the radius of the first end 53 of the second rotating member 52 as the rotating member 40 pivots around axis B as well. The second end 53 of the second rotating member 52 can have a push surface 146 that is positioned to engage the first end 142 of the second engaging member 140 and the second end 124 of the second wing actuator 120 so that the second end 124 of the second wing actuator 120 can push against it. The second rotating member 52 can also be pivotally connected to the center frame 24 so that the second rotating member 52 can pivot around axis C as well. When the second wing actuator 120 is extended, the second end 124 of the second wing actuator 120 will push against the first end 142 of the second engaging member 140 and pivot the second engaging member 140 around axis C until the first end 142 of the second engagement member 140 and the second end 124 of the second wing actuator 120 pivot into contact with the push surface 146 on the first end 53 of the second rotating member 52 causing the second rotating member 50 to rotate around axis B. The second rotating member 52 will in turn pull the second wing section 60 forward, pivoting the second wing section 60 around the second connection member 68.

When the first wing actuator 110 is retracted, the second end 114 of the first wing actuator 110 connected to the first engaging member 130 can be pivoted out of contact with the push surface 136 of the first rotating member 50 so that there is no physical engagement between the second end 114 of the first wing actuator 110 and the first rotating member 50 allowing the first wing section 40 to pivot freely around the first connection member 48. When the second wing actuator 120 is retracted, the second end 124 of the second wing actuator 120 connected to the second engaging member 140 can be pivoted out of contact with the push surface 146 of the second rotating member 52 so that there is no physical engagement between the second end 124 of the second wing actuator 120 and the second rotating member 52 allowing the second wing section 60 to pivot freely around the second connection member 68.

With the first wing section 40 and the second wing section 60 pivoted forwards, substantially perpendicular to the travel direction, T, of the land roller 10, the wheel actuators 39 can be retracted to pull the ground wheels 38 off of the ground surface to finish placing the land roller 10 in the operating position.

When the first wing actuator 110 and the second wing actuator 120 are retracted, the first wing section 40 and the second wing section 60 can swing freely behind the center section 20 as the land roller 10 is towed behind a two vehicle in the transport position.

Figure 8:
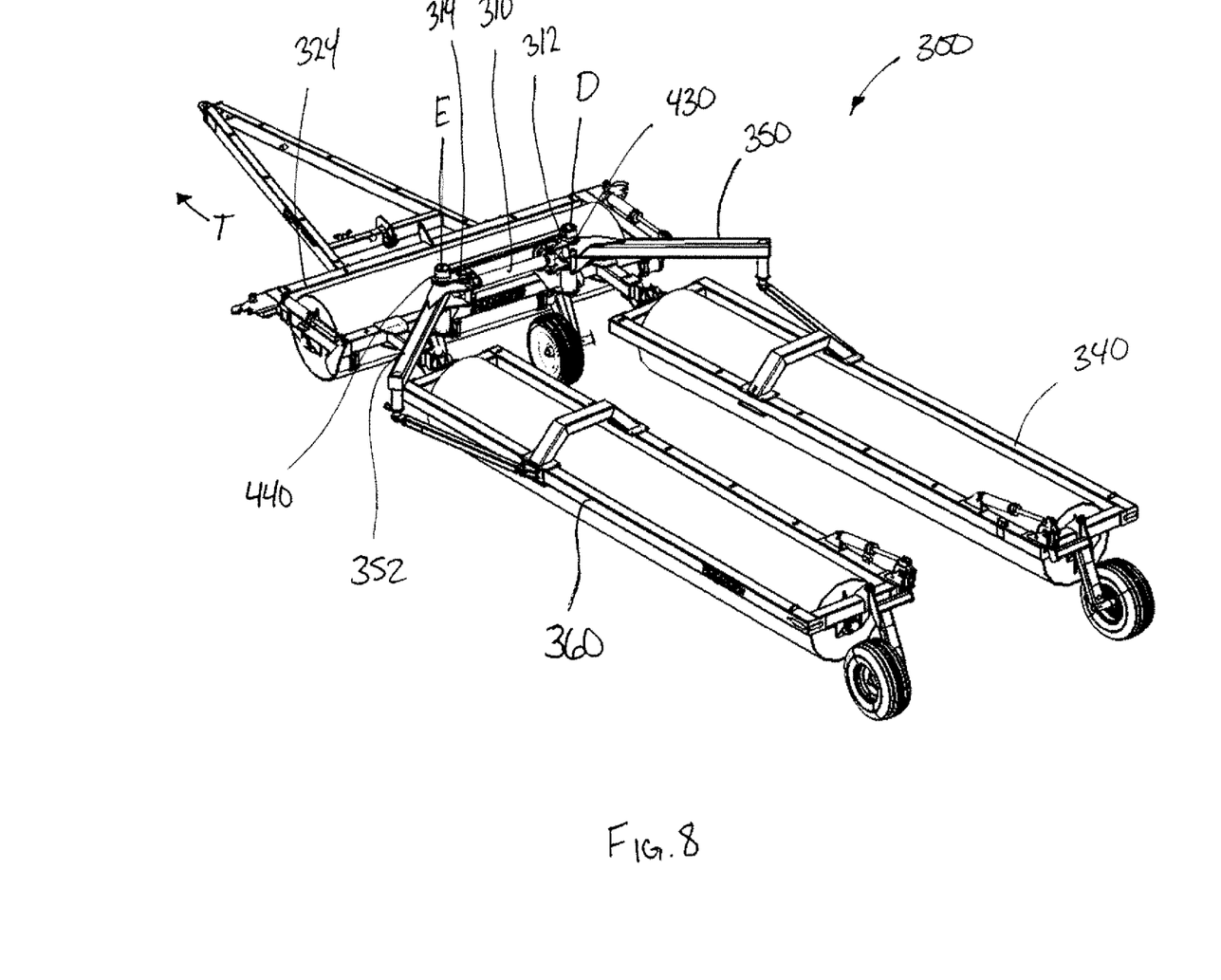
FIG. 8 illustrates a rear perspective view of a land roller in another aspect.
Figure 9:
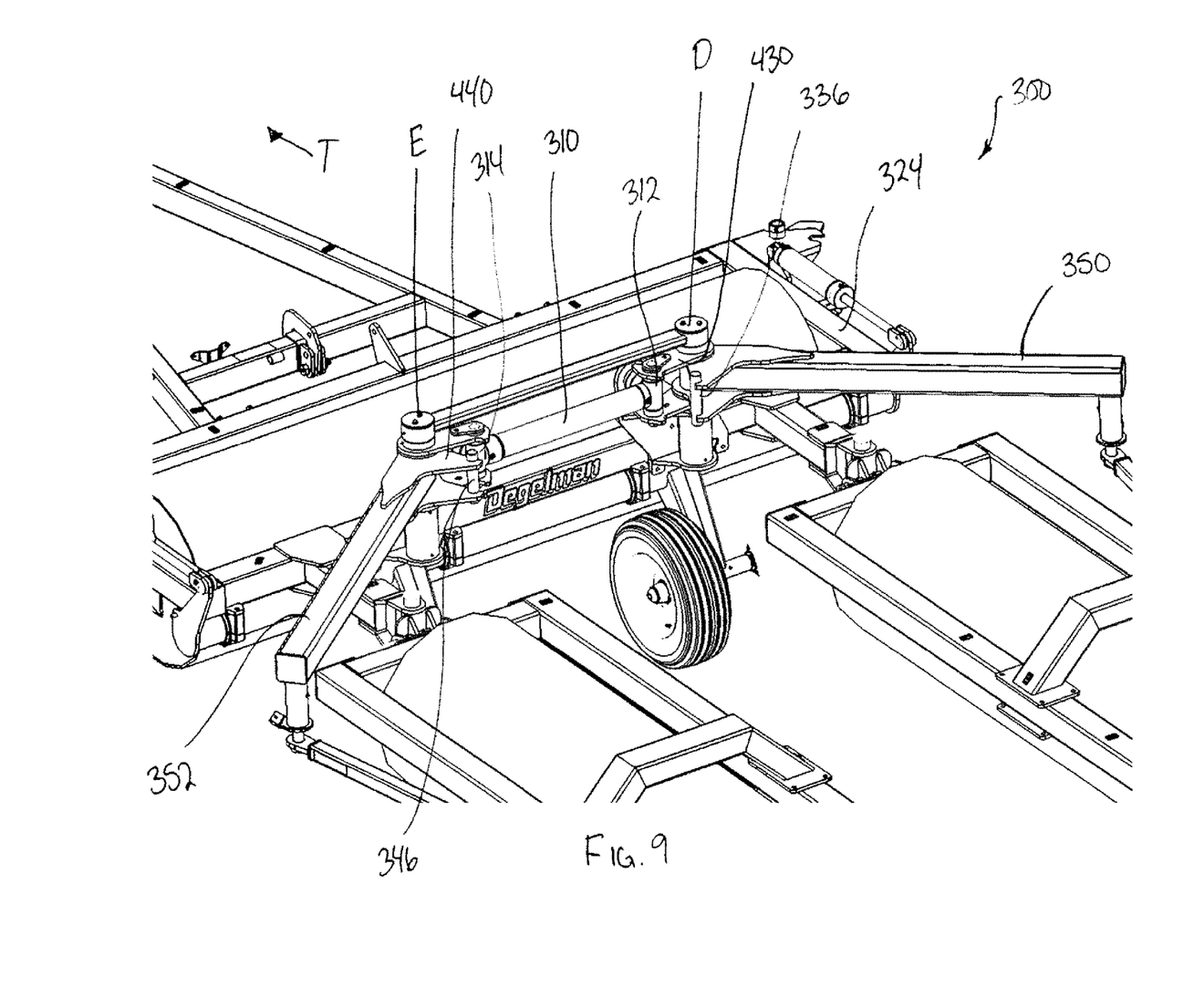
FIG. 9 illustrates a close up view of a single actuator on a center section of the land roller of FIG. 8.

FIG. 8 illustrates an alternate land roller 300 where a single actuator 310, rather than two actuators, is used to rotate the first wing section 340 and the second wing section 360 into their operating position; substantially perpendicular to the travel direction, T, of the land roller 300. A first end 312 of the actuator 310 can be connected to a first engaging member 430 and the second end 314 of the actuator 310 can be connected to a second engaging member 440. The first engaging member 430 can be movable so that it guides the first end 312 of the actuator 310 in a radius so that the first end 312 of the actuator 310 comes into contact with a push surface 336 on a first rotation member 350, but the first end 312 of the actuator 310 is not physically attached to the first rotation member 350. As can be seen in FIG. 9, the first engaging member 430 can pivot around an axis D with the first rotation member 350 also pivotally connected to the center frame 324 so that the first rotation member 350 pivots around axis D, as well. In a similar manner, a second end 314 of the actuator 310 can be connected to a second engaging member 440 that guides the second end 314 of the actuator 310 in a radius so that the second end 314 of the actuator 310 comes into contact with a push surface 346 on a second rotation member 352, but the second end 314 of the actuator 310 and the second rotation member 352 are not physically connected. The second engaging member 440 can pivot around an axis E with the second rotation member 352 also pivotally connected to the center frame 324 so that the second rotation member 352 pivots around axis E, as well. When the actuator 310 is extended, the first end 312 of the actuator 310 will be forced against the push surface 336 of the first rotation member 350 and will rotate the first rotation member 350 around axis D. At the same time, the second end 314 of the actuator 310 will be forced against the push surface 346 of the second rotation member 352 and will start to rotate the second rotation member 352 around axis E. Eventually, the first end 312 and the second end 314 of the actuator 310 will be extended far enough that the first rotating member 350 and the second rotating member 352 will be rotated around the axis D and axis E and in turn will have rotated the first wing section 340 and the second wing section 360 forwards, substantially perpendicular to the travel direction T of the land roller 300.

During this operation, the first end 312 of the actuator 310 and the second end 314 of the actuator 310 are never directly connected to the first rotating member 350 and second rotating member 352, respectively, but instead are only in temporary pressed engagement. When the actuator 310 is retracted the first end 312 of the actuator 310 and the second end 314 of the actuator 310 are rotated away from physical contact with the first rotating member 350 and the second rotating member 352, respectively.

Referring again to the land roller 10 shown in FIGS. 1-7, with the first wing section 40 and the second wing section 60 rotated forwards in the operating position as shown in FIG. 3, the land roller 10 can be converted into the travel position shown in FIG. 4. The wheel actuators 39 can be extended to force the ground wheels 38 onto the ground surface and, as the wheel actuators 39 continue to extend, lifting and then supporting the weight of the center roller 22 off of the ground surface by the extended ground wheels 38. The first wing actuator 110 and the second wing actuator 120 can be retracted causing the second end 114 of the first wing actuator 110 to pivot away from being in contact with the first rotation member 50 and the second end 134 of the second wing actuator 120 to pivot away from being in contact with the second rotation member 52. This will allow the first wing section 40 and the second wing section 60 to pivot freely around axis B and axis C, respectively. To cause the first wing section 40 and the second wing section 60 to fold back into the transport position, an operator of the tow vehicle 2 can simply drive the two vehicle forward thereby pulling the land roller 10 forward while the first wing actuator 110 and the second wing actuator 120 are retracted. This will cause the first wing section 40 and the second wing section 60 to rotate around the first connecting member 48 and the second connecting member 68 until the first wing section 40 and the second wing section 60 are substantially parallel with the travel direction of the land roller 10.

The travelling wheels 49, 69 can be folded downwards causing the first wing roller 42 in the first wing section 40 and the second wing roller 62 in the second wing section 60 be supported off the ground by the travelling wheels 49, 69. The travelling wheels 49, 69 can be folded downwards when the first wing section 40 and the second wing section 60 are still positioned substantially perpendicular to the travel direction, T, and before the land roller 10 is pulled forward so that the travelling wheels 49, 69 are down when the first wing section 40 and the second wing section 60 are pivoted backwards from the forward motion of the tow vehicle 2. Alternatively, the travelling wheels 49, 69 could be folded downwards after the first wing section 40 and the second wing section 60 have been pivoted into the transport position to lift the first wing roller 42 and the second wing roller 62 off of the ground surface.

When the land roller 10 is in the transport position, the land roller 10 can be moved from location to location, such as along public roads. During transport, when the land roller 10 has to be maneuvered around a corner, the first wing section 40 and the second wing section 60 can pivot freely around the first connecting member 48 and the second connecting member 68 because the first wing actuator 110 and the second wing actuator 120 are retracted and not in physical contact or even operatively connected to the first wing section 40 and the second wing section 60. This allows an additional degree of articulation in the land roller 10 as it is being turned through a corner. If the wing actuators 110, 120 were connected directly at their second ends 114, 124 to the wing sections 40, 60, the wing sections 40, 60 would be locked in position behind the center section 20 and locked in a position substantially parallel to the travel direction T of the land roller 10. This would make negotiating turns with the land roller 10 in the transport position very difficult because there would not be this additional point of articulation. Even if the wing actuators 110, 120 were put in a "float mode" where they were free to extend and retract as the land roller 10 moved and the wing sections 40, 60 pivoted, this can prematurely wear out the wing actuators 110, 120.

When the land roller 10 has arrived at its intended destination and it is desired to once again move the land roller 10 into the operating position, the first wing actuator 110 and the second wing actuator 120 can be used to rotate the first wing section 110 and the second wing section 120 around axes B and C to place the first wing section 110 and the second wing section 120 substantially perpendicular to the travel direction T of the land roller 10.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A land roller comprising:
a center section comprising a center roller;
a hitch member connected to the center section;
a first wing section pivotally connected at a first end to the center section, the first wing section comprising a first wing roller;
a second wing section pivotally connected at a first end to the center section, the second wing section comprising a second wing roller; and
at least one actuator operative to rotate a first rotating member that pivots the first wing section and rotate a second rotating member that pivots the second wing section into an operating position from a transport position while the center section remains stationary,
the at least one actuator unconnected to the first rotating member and the second rotating member,
wherein the first wing section and the second wing section are positioned substantially perpendicular to a travel direction of the land roller when the land roller is in the operating position,
wherein the first wing section and the second wing are positioned substantially parallel to the travel direction of the land roller when the land roller is in the transport position,
wherein the center section has a center frame having a front member and a rear member and the center roller extends downwards from the center frame,
wherein the first rotating member is pivotally connected to the center frame at a first pivot connection and the second rotating member is pivotally connected to the center frame at a second pivot connection,
wherein the land roller further comprises: a first linkage connected between the first rotating member and the first wing section and a second linkage connected between the second rotating member and the second wing section,
and wherein a second end of the first rotating member is pivotally connected to a first end of the first linkage and a second end of the first linkage is pivotally connected to the first wing section and wherein a second end of the second rotating member is pivotally connected to a first end of the second linkage and a second end of the second linkage is pivotally connected to the second wing section.

2. The land roller of claim 1 wherein the at least one actuator comprises a first wing actuator and a second wing actuator and wherein the first wing actuator is connected at a first end to the center section and at a second end to a first engaging member and wherein the second wing actuator is connected at a first end to the center section and at a second end to a second engaging member.

3. The land roller of claim 2 wherein the first wing actuator and the second wing actuator are hydraulic cylinders.

4. The land roller of claim 2 wherein the first rotating member and the first engaging member rotate around a first axis and wherein the second rotating member and the second engaging member rotate around a second axis.

5. The land roller of claim 2 wherein a push surface is provided on a first end of the first rotating member and the second end of the first wing actuator comes into contact with the push surface on the first end of the first rotating member when the first wing actuator is extended.

6. The land roller of claim 5 wherein a push surface is provided on a first end of the second rotating member and the second end of the second wing actuator comes into contact with the push surface on the first end of the second rotating member when the second wing actuator is extended.

7. The land roller of claim 2 further comprising ground wheels attached to the rear member of the center frame, the ground wheels extending downward from the rear member.

8. The land roller of claim 7 further comprising a first connection member and a second connection member connected to the rear member of the center frame and wherein the first wing section is pivotally connected at the first end of the first wing section to the first connection member and the second wing section is pivotally connected at the first end of the second wing section to the second connection member.

9. The land roller of claim 2 wherein the first wing section has a first wing frame and the first wing roller extends downwards from the first wing frame and wherein the second wing section has a second wing frame and the second wing frame extends downwards from the second wing frame.

10. The land roller of claim 9 further comprising at least one travelling wheel connected to a second end of the first wing section and at least one traveling wheel connected to a second end of the second wing section.

11. The land roller of claim 10 wherein the at least one travelling wheel connected to the second end of the first wing section is fixed in direction and pivotal upwards and wherein the at least one travelling wheel connected to the second end of the second wing section is fixed in direction and pivotal upwards.

12. The land roller of claim 1 wherein the land roller can be moved between: the transport position with the first wing section and the second wing section positioned substantially parallel to a travel direction of the land roller and behind the center section; and the operating position with the first wing section and the second wing section moved into position substantially perpendicular to a travel direction of the land roller.

13. The land roller of claim 12 wherein the first wing section and the second wing section are pivoted forward from the operating position into the transport position.

14. The land roller of claim 2 further comprising at least one hitch connection member extending downwards from the front member of the center frame, the hitch member pivotally connected to the at least one hitch connection member below the front member.

15. The land roller of claim 14 wherein a connection axis is defined where the hitch member is pivotally connected to the at least one hitch connection member.

16. The land roller of claim 15 further comprising a center actuator connected between the hitch member and the front member of the center frame to pivot the center section relative to the hitch member around the connection axis.

17. The land roller of claim 1 wherein the at least one actuator comprises an actuator and wherein the actuator is connected at a first end to a first engaging member and wherein the actuator is connected at a second end to a second engaging member.

18. The land roller of claim 17 wherein the actuator is a hydraulic cylinder.

19. The land roller of claim 17 wherein the first rotating member and the first engaging member rotate around a first axis and wherein the second rotating member and the second engaging member rotate around a second axis.

20. The land roller of claim 17 wherein a push surface is provided on a first end of the first rotating member and the first end of the actuator comes into contact with the push surface on the first end of the first rotating member when the actuator is extended.

21. The land roller of claim 20 wherein a push surface is provided on a first end of the second rotating member and the second end of the actuator comes into contact with the push surface on the first end of the second rotating member when the second wing actuator is extended.

* * * * *